(Model.)
M. CODY.
Machine for Washing Bottles, Lamp Chimneys, Tumblers, &c.
No. 232,458. Patented Sept. 21, 1880.
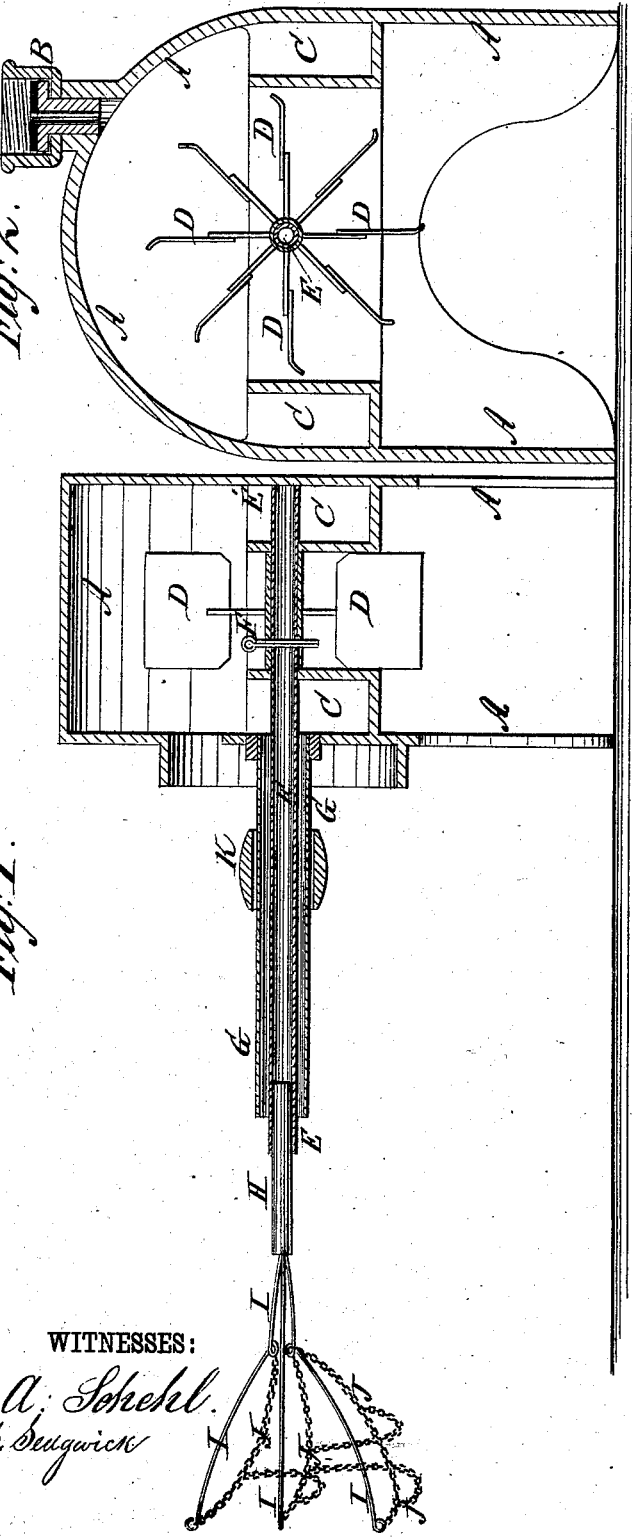
WITNESSES:
A. Schehl
C. Sedgwick
INVENTOR:
M. Cody
BY Munn & Co
ATTORNEYS.
N. PETERS, PHOTO-LITHOGRAPHER, WASHINGTON, D. C.

UNITED STATES PATENT OFFICE.

MICHAEL CODY, OF BOSTON, MASSACHUSETTS.

MACHINE FOR WASHING BOTTLES, LAMP-CHIMNEYS, TUMBLERS, &c.

SPECIFICATION forming part of Letters Patent No. 232,458, dated September 21, 1880.

Application filed May 3, 1880. (Model.)

*To all whom it may concern:*

Be it known that I, MICHAEL CODY, of Boston, in the county of Suffolk and State of Massachusetts, have invented a new and useful Improvement in Machines for Washing Bottles, Lamp-Chimneys, Tumblers, and other Vessels, of which the following is a specification.

Figure 1 is a sectional side elevation of the improvement. Fig. 2 is a sectional end elevation.

Similar letters of reference indicate corresponding parts.

The object of this invention is to furnish machines for washing bottles, lamp-chimneys, tumblers, cups, and other vessels, so constructed as to wash the vessels quickly and thoroughly, removing any sediment that may be in the vessels, and which shall be simple in construction and convenient in use.

A represents the case or shell of the machine, which is made of such a shape and size as to be conveniently handled. In the top of the shell A is formed an opening, in which is swiveled a screw collar or coupling, B, to be screwed upon the faucet of a water-pipe. Around the inner middle part of the shell A is formed a chamber or trough, C, to which is pivoted the tubular hub of a small water-wheel, D, against the buckets of which the water is discharged, a part of the said water spattering into the chamber or trough C.

E is a tubular shaft which passes through and revolves in holes in the shell A and the walls of the chamber C. The tubular shaft E also passes into and through the hollow hub of the wheel D, and is secured to the said hub by a split pin, F, or other suitable means. The outer part of the tubular shaft E passes through a tube, G, the inner end of which is screwed into the hole in the shell A, through which the said tubular shaft E passes.

The tube G is made larger than the tubular shaft E, so that water from the chamber C can pass out through the said tube into the bottles being washed.

The tubular handle H is inserted in the projecting end of tube E, and receives a cylindrical brush or one consisting of the rods I and slack chains J.

K is a band or ferrule placed and sliding freely upon the tube G, so that it can be slid outward upon the rods I to force them together and allow the brush to be readily inserted in a bottle or other small-mouthed vessel.

The brushes H I J are designed to be made of various sizes, as the size of the vessel to be washed may require.

Having thus fully described my invention, I claim as new and desire to secure by Letters Patent—

1. The combination, in a bottle-washer, with the case A and the tubular shaft E, that carries the wheel D, of the chamber C and the tube G, the latter connecting with said chamber and surrounding and extending not quite to the end of tube E, as and for the purpose specified.

2. In a machine for washing bottles and other vessels, the brush constructed substantially as herein shown and described, consisting of the handle H, the bent rods I, and the chains J, whereby all parts of the inner surface of the vessel can be washed, as set forth.

MICHAEL CODY.

Witnesses:
JOHN F. GILLESPIE,
JOSEPH O'HARE.